(12) United States Patent
Hennessy et al.

(10) Patent No.: US 11,236,252 B2
(45) Date of Patent: Feb. 1, 2022

(54) REUSEABLE WRAPPING ORNAMENT

(71) Applicants: Daniel Patrick Hennessy, Reno, NV (US); Kristen Elaine Hennessy, Reno, NV (US)

(72) Inventors: Daniel Patrick Hennessy, Reno, NV (US); Kristen Elaine Hennessy, Reno, NV (US)

(73) Assignee: Hennessy Gift Wrap, Inc., Reno, NV (US)

( * ) Notice: Subject to any disclaimer, the term of this patent is extended or adjusted under 35 U.S.C. 154(b) by 88 days.

(21) Appl. No.: 16/582,717

(22) Filed: Sep. 25, 2019

(65) Prior Publication Data

US 2021/0087433 A1 Mar. 25, 2021

(51) Int. Cl.
*C09J 7/20* (2018.01)
*D04D 9/00* (2006.01)
*C09J 7/40* (2018.01)
*C09J 7/38* (2018.01)
*C09J 5/00* (2006.01)

(52) U.S. Cl.
CPC ............... *C09J 7/203* (2018.01); *C09J 5/00* (2013.01); *C09J 7/38* (2018.01); *C09J 7/403* (2018.01); *D04D 9/00* (2013.01); *C09J 2301/12* (2020.08); *C09J 2301/502* (2020.08); *Y10T 428/14* (2015.01)

(58) Field of Classification Search
CPC ..... C09J 7/203; C09J 7/38; C09J 7/403; C09J 5/00; C09J 2301/12; C09J 2301/502; D04D 9/00; Y10T 428/14
See application file for complete search history.

(56) References Cited

U.S. PATENT DOCUMENTS

| | | | |
|---|---|---|---|
| 738,462 A | 9/1903 | Lincoln | |
| 925,694 A | 6/1909 | Greenwood | |
| 5,004,144 A | 4/1991 | Selga | |
| 5,361,413 A | 11/1994 | Schaefer | |
| 5,367,752 A | 11/1994 | Petty | |
| 5,543,190 A * | 8/1996 | Johnson | B42F 5/00 281/22 |
| 6,248,414 B1 * | 6/2001 | Donahue | B42F 15/066 24/67 AR |
| 7,640,632 B2 | 1/2010 | Lazarus | |
| 7,704,588 B1 | 4/2010 | Mrofka | |
| 8,820,117 B2 * | 9/2014 | Fox | A01K 13/003 63/12 |
| 2002/0071919 A1 | 6/2002 | Levesque | |
| 2003/0096066 A1 | 6/2003 | Clark | |
| 2006/0249172 A1 | 11/2006 | Ballew | |
| 2013/0108884 A1 | 5/2013 | Lillich | |
| 2017/0259973 A1 | 9/2017 | Crossno | |

OTHER PUBLICATIONS

Double Sided Tape Strips Product Examples, Tapestrips, available at: https://www.tapestrips.com/double-sided-tape, 1 page.

* cited by examiner

*Primary Examiner* — Patricia L. Nordmeyer
(74) *Attorney, Agent, or Firm* — Goodman Law Center; Mark A. Boodman, Esq.

(57) ABSTRACT

A decorative ornament for use on wrapping paper or the like includes an ornamental element, such as a ribbon flower or bow. The ornament for includes an attachment element for securing the ornament to wrapping paper. The attachment element includes a stack of adhesive pads. By peeling away the pads one at a time to selectively expose the next underlying adhesive pad, the decorative ornament can be used multiple times.

5 Claims, 4 Drawing Sheets

REUSEABLE WRAPPING ORNAMENT

FIELD OF THE INVENTION

The present invention relates to ornamental devices and in particular ornaments used in wrapping of presents, gifts, etc.

BACKGROUND OF THE INVENTION

Decorative wrapping is a common practice. Many decorative ornaments may be used in wrapping of gifts or presents, including, without limitation, bows, ribbons, etc. Many ornamental devices may also be made from ribbon material, such as ornamental flowers. Other materials may be used for forming decorative wrapping ornaments.

Wrapping is largely single use and disposable. Thus, the motivation to use decorative ornaments that can add expense to the cost of wrapping may be reduced. With a push towards minimizing single use items, there is a further requirement for alternative decorative wrapping ornaments.

SUMMARY OF ONE EMBODIMENT OF THE INVENTION

Advantages of One or More Embodiments of the Present Invention

The various embodiments of the present invention may, but do not necessarily, achieve one or more of the following advantages:

the ability to decorate wrapping;
provide a reusable wrapping ornament;
reduce the disposability and single-use nature of wrapping ornaments;
provide an aesthetic yet functional wrapping ornament.

These and other advantages may be realized by reference to the remaining portions of the specification, claims, and abstract.

Brief Description of One Embodiment of the Present Invention

In one aspect of the present invention, there is a provided a decorative wrapping ornament. The ornament may include an ornament element, and a reusable attachment element secured to the ornament. The reusable attachment element may include a plurality of selectively exposable adhesive elements.

In one aspect of the present invention, there is provided a method for applying a decorative ornament to wrapping. The decorative ornament may comprise an ornament element and a reusable attachment element comprising a plurality of selectively exposable adhesive elements. The method may comprise selectively exposing a first adhesive element of the plurality of adhesive elements and applying the first adhesive element to first wrapping to secure the decorative ornament to the first wrapping. The decorative ornament may be removed from the first wrapping. A second adhesive element of the plurality of adhesive elements may be selectively exposed and the second adhesive element may be applied to second wrapping.

In one aspect of the present invention, there is provided a decorative wrapping ornament. The decorative wrapping ornament may include ornament means and reusable attachment means secured to the ornament means. The reusable attachment means may comprise a plurality of selectively exposable adhesive means for adhering the decorative ornament to the wrapping.

The above description sets forth, rather broadly, a summary of one embodiment of the present invention so that the detailed description that follows may be better understood and contributions of the present invention to the art may be better appreciated. Some of the embodiments of the present invention may not include all of the features or characteristics listed in the above summary. There are, of course, additional features of the invention that will be described below and will form the subject matter of claims. In this respect, before explaining at least one preferred embodiment of the invention in detail, it is to be understood that the invention is not limited in its application to the details of the construction and to the arrangement of the components set forth in the following description or as illustrated in the drawings. The invention is capable of other embodiments and of being practiced and carried out in various ways. Also, it is to be understood that the phraseology and terminology employed herein are for the purpose of description and should not be regarded as limiting.

DESCRIPTION OF CERTAIN EMBODIMENTS OF THE PRESENT INVENTION

In the following detailed description of the preferred embodiments, reference is made to the accompanying drawings, which form a part of this application. The drawings show, by way of illustration, specific embodiments in which the invention may be practiced. It is to be understood that other embodiments may be utilized and structural changes may be made without departing from the scope of the present invention.

Figure 1:
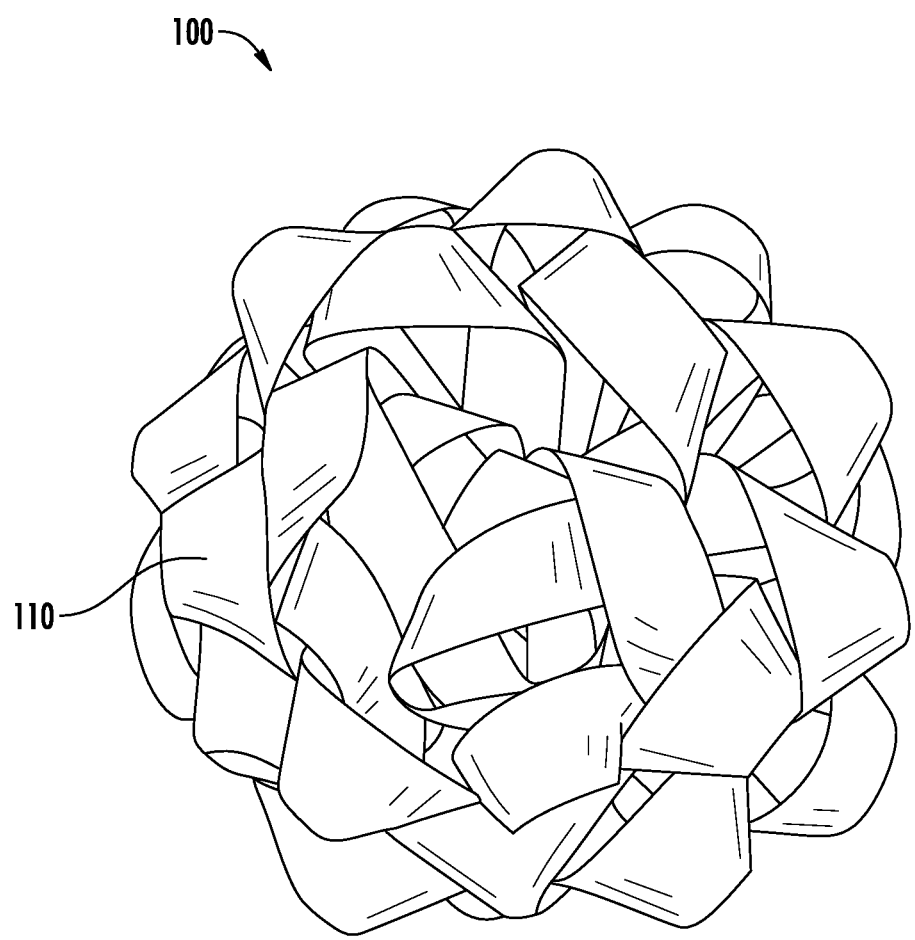
FIG. 1 substantially shows an ornament side view of a wrapping ornament in accordance with an embodiment of the present invention.
Figure 2:
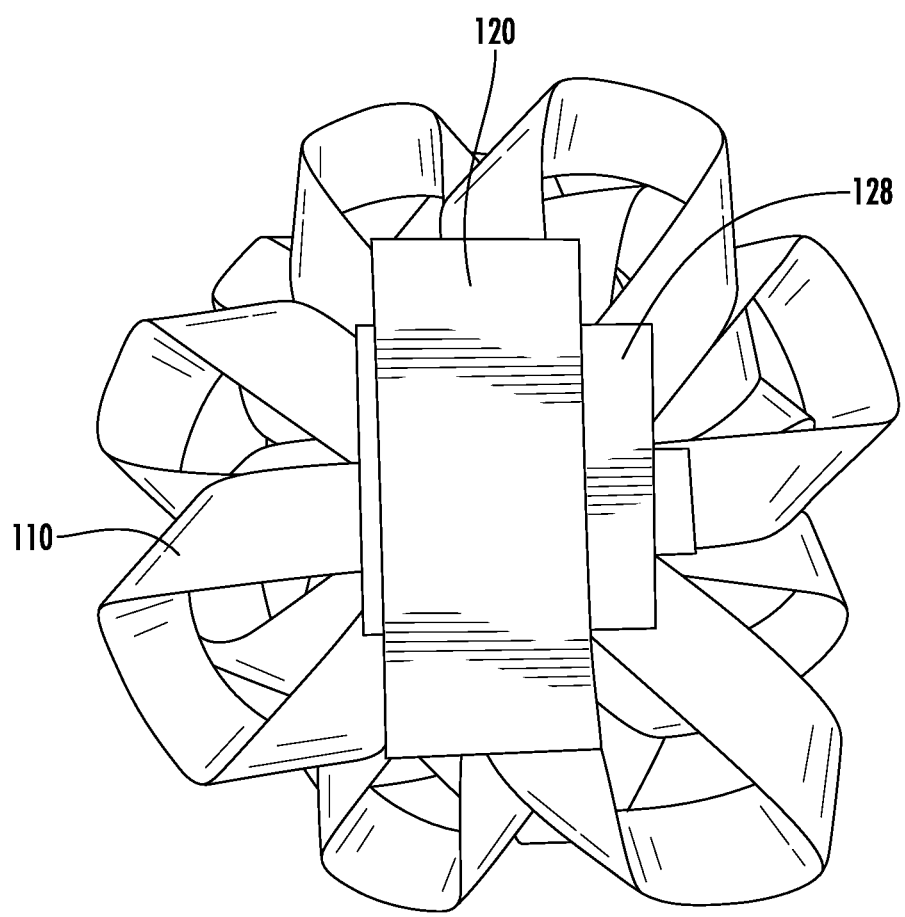
FIG. 2 substantially shows an attachment side of the wrapping ornament of FIG. 1.

An embodiment of a decorative wrapping ornament is depicted in FIGS. 1 and 2. The ornament 100 includes an ornament element 110 and an attachment element 120. The ornament element 110 may be any particular decorative wrapping ornament. Ornament elements may include bows, ribbon flowers, animal shapes, etc. The ornamental element may be shaped from ribbon. The material of the ornamental element may be any suitable material including plastic, fabric, cloth, felt, metal, wood, etc. In the particular embodiment depicted, the ornament element 110 is a flower shaped from a polyester ribbon material.

Figure 3:
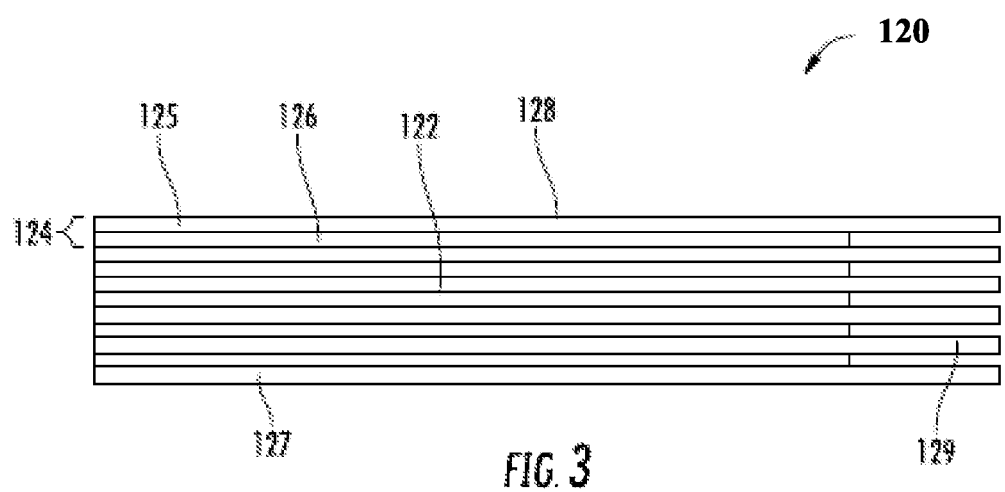
FIG. 3 substantially shows a schematic side view of a stack of adhesive pads.
Figure 4:
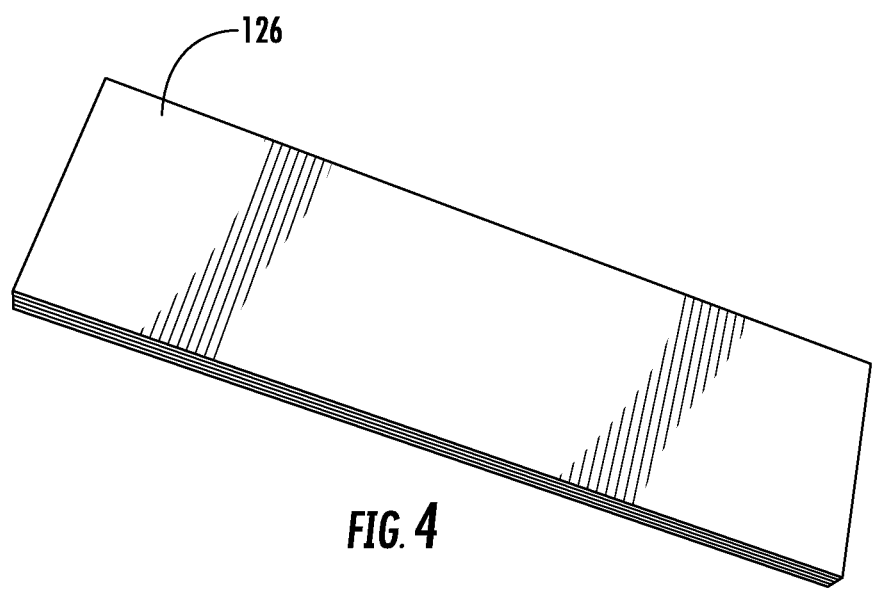
FIG. 4 substantially shows a bottom view of the stack of adhesive pads.

As shown in FIG. 3, the attachment element 120 includes a stack 122 of adhesive pads 124. Each pad 124 of the adhesive stack may include a planar support substrate 125, such as of paper or card and a peelable pressure sensitive adhesive layer 126 that is removable from the next underlying pad. Each adhesive pad may be selectively removed from the underlying pad. The outer most layer of the stack 122 (bottom layer in FIG. 3) may include a cover piece 127 that does not include an exposed adhesive. This allows the product to be shipped without sticking to other products. The innermost layer 128 of the stack 122 (FIG. 2) may be secured to a backing piece 128 of the ornament element 110 through suitable fasteners including, without limitation, staples, adhesives, rivets, etc. The stack 122 may alternatively be secured directly to the ornament 110.

To use the wrapping ornament 100, the cover piece 126 of the stack 122 may be removed to expose the adhesive of the outermost pad 124. The cover piece may be discarded, or may be retained to be re-applied to the stack for later storage. With the adhesive of the outermost pad 124 of the stack 122 exposed, the product may be applied to wrapping. Ordinarily, a wrapping ornament would be discarded with the wrapping once the wrapping had been removed from the present or gift. In the case of the wrapping ornament 100 of the present application, the wrapping ornament may be removed from the wrapping and retained. To reuse the wrapping ornament, the outermost pad of the stack 122 may be removed to expose the next underlying pad and adhesive. The wrapping ornament may be then be adhered to the wrapping of another gift. The wrapping ornament may be reused until the number of adhesive pads has been exhausted.

Each pad 124 of the stack may include a free end 129 that does not have any adhesive. This allows the individual pads to be readily separated from each other. Further, free end will not be adhered to the wrapping and will therefore provide a means for easily gripping the wrapping ornament for removal from the wrapping.

The stack 122 may include any number of adhesive pads 124. However, too many and the aesthetic appeal of the wrapping ornament is reduced due to the thickness of the stack. The present Applicant has found approximately 10-20 pads in the stack to provide a balance between being able to reuse the wrapping ornament a useful number of times and the aesthetic look of the wrapping ornament.

The adhesive used in the stack may be selected for its adhesive strength. In one embodiment, the adhesive may be selected so that it can be readily removed from paper wrapping without tearing or substantially affecting the wrapping paper. In an alternative embodiment, the adhesive strength may be stronger so that the wrapping ornament is less likely to be inadvertently removed from the wrapping paper. When the wrapping ornament is intentionally removed, the wrapping paper may be torn and remain adhered to the outermost adhesive pad, allowing the wrapping ornament to be stored without adhering to other products. When the wrapping ornament is to be re-used, the outer layer with adhered wrapping paper of the previous use may be removed to expose the next underlying adhesive pad.

While the method describes applying the ornamental product onto wrapping, the product may alternatively be applied directly onto the gift or any other item.

The attachment elements are depicted herein as rectangle pads. Other shapes of adhesive pads are contemplated, including triangles, circles, ellipses, etc. Adhesive-free sections for facilitating separation may be incorporated into any of these shapes as required.

Although the description above contains many specifications, these should not be construed as limiting the scope of the invention but as merely providing illustrations of some of the embodiments of this invention. Thus, the scope of the invention should be determined by the appended claims and their legal equivalents rather than by the examples given.

What is claimed is:

1. A decorative ornament for use on a wrapping, the decorative ornament comprising:
   (A) an ornament element;
   (B) a reusable attachment element secured to the ornament, the reusable attachment element comprising a stack of selectively exposable adhesive elements;
   (C) wherein each of the selectively exposable adhesive elements of the stack include a non-adhesive planar support layer and an adhesive layer;
   (D) the stack is configured such that a first outermost non-adhesive planar support layer is exposed initially;
   (E) each non-adhesive planar support layer includes a free end enabling it to be readily removed from the stack;
   (F) wherein when a first outermost non-adhesive planar support layer is removed from the stack, a first outermost adhesive layer is exposed, the first outermost adhesive layer may then be adhered to the wrapping;
   (G) wherein the adhesive is selected such that when the decorative ornament is removed from the wrapping, the entire first outermost adhesive layer remains adhered to the wrapping;
   (H) wherein a second next outermost non-adhesive planer support layer is then exposed allowing the decorative ornament to then be reused, and allowing the decorative ornament to be readily stored without adhering to items when not desired.

2. The decorative ornament of claim 1 wherein the ornament element comprises a ribbon arrangement.

3. The decorative ornament of claim 2 wherein the ribbon arrangement comprises a ribbon flower.

4. The decorative ornament of claim 1, wherein the adhesive is selected such that the wrapping may be torn leaving a portion of the wrapping adhered to an adhesive pad allowing the decorative ornament to be stored without adhering to other items.

5. The decorative ornament of claim 1, wherein the stack includes a cover piece and wherein the cover piece can be removed and re-applied to the stack.

* * * * *